May 6, 1941.   J. E. MERRILL   2,240,511
OPHTHALMIC MOUNTING
Filed March 24, 1938
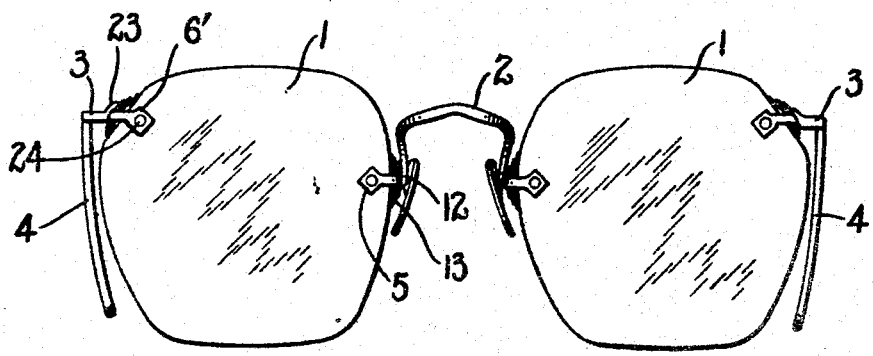
Fig. I
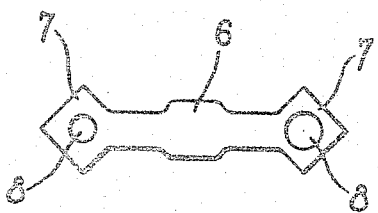    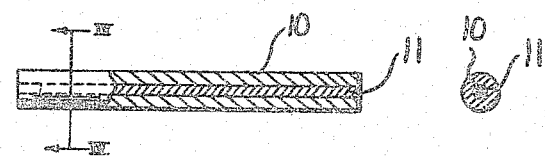
Fig. II    Fig. III    Fig. IV
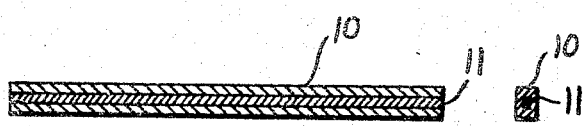    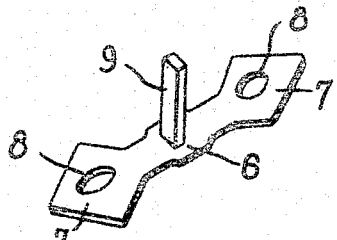
Fig. V    Fig. VI    Fig. VII
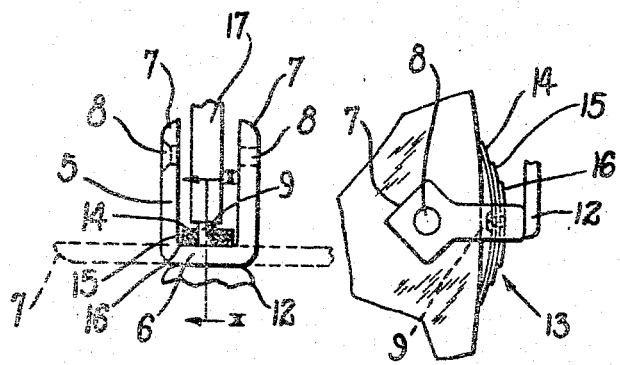    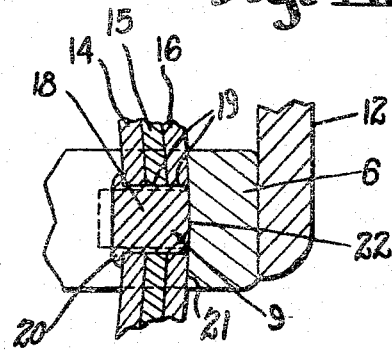
Fig. VIII    Fig. IX    Fig. X
INVENTOR.
JOHN E. MERRILL
BY Harry H. Styll
ATTORNEY.

Patented May 6, 1941

2,240,511

UNITED STATES PATENT OFFICE 2,240,511

OPHTHALMIC MOUNTING

John E. Merrill, Southbridge, Mass., assignor to American Optical Company, Southbridge, Mass., a voluntary association of Massachusetts Application March 24, 1938, Serial No. 197,837

2 Claims. (Cl. 88—47)

This invention relates to improvements in ophthalmic mountings and has particular reference to improved lens holding means and method of making the same.

One of the principal objects of the invention is to provide a novel construction of lens strap or lens holding means of a type having resilient means for easing off the rigidity of the connection of said lens holding means to the lens wherein the said resilient means will be more positively held in desired relation with the lens strap or lens holding means during use, and to provide a novel method of making and assembling the parts of such lens holding means.

Another object of the invention is to provide novel means and method of securing the resilient sections to the lens strap or lens holding means.

Another object of the invention is to provide novel means and method of taking up any looseness and play in the connected parts whereby the said parts will be more positively maintained in desired aligned relation with each other during use.

Other objects and advantages of the invention should become apparent from the following description taken in connection with the accompanying drawing and it will be apparent that many changes may be made in the details of construction, arrangement of parts and methods shown and described without departing from the spirit of the invention as expressed in the accompanying claims. I, therefore, do not wish to be limited to the exact details of construction, arrangement of parts and methods shown and described as the preferred forms only have been given by way of illustration.

Referring to the drawing:

Fig. I is a front elevation of an ophthalmic mounting embodying the invention;

Fig. II is a plan view of a portion of the lens holding means or lens strap illustrating one step in the process of manufacture;

Fig. III is a longitudinal sectional view of the bar stock from which the connecting means embodying the invention is formed and illustrating a step in the process of manufacture;

Fig. IV is a sectional view taken as on line IV—IV of Fig. III;

Fig. V is a view generally similar to Fig. III illustrating another step in the process of manufacture;

Fig. VI is a transverse sectional view of the bar stock illustrated in Fig. V;

Fig. VII is a perspective view showing the parts of Figs. II and V in assembled relation with each other and illustrating another step in the process of manufacture;

Fig. VIII is an end view of the lens strap or lens holding means illustrating further steps in the process of manufacture;

Fig. IX is a front view of the lens strap or lens holding means illustrated in Fig. VIII showing the same positioned on a lens; and Fig. X is an enlarged fragmentary sectional view taken as on line X—X of Fig. VIII showing the relation of the parts when in finished assembled relation with each other.

Although lens straps or lens holding means of the type having resilient means for easing off the connection of the lens holding means to the lens are very desirable, much difficulty has been encountered in the past in obtaining a practical method and means of securing the resilient means to such lens straps or lens holding means whereby the assembled parts will maintain a positive desired aligned relation with each other during use.

Many different arrangements have been tried and although some of these arrangements were practical, from the viewpoint of utility, they were either difficult or expensive to manufacture.

The present invention is directed particularly to novel means and method of forming and assembling the parts of such lens holding means or lens straps wherein the various parts may be more positively secured in desired relation with each other and may be quickly and easily assembled during the process of manufacture. Another feature of the present invention is to provide novel means and method of durably maintaining the parts in desired aligned relation with each other during use.

Referring to the drawing wherein like characters of reference designate like parts throughout the several views, the device embodying the invention comprises broadly a pair of lenses 1 connected by a bridge member 2 and having temple supporting end pieces 3 thereon to which suitable temples 4 are pivotally attached.

The bridge member 2 and end pieces 3 are secured to the lenses by lens straps 5 and 6' embodying the invention.

The lens straps or lens holding means 5 are attached to the lenses at a position known in the art as "on-center" and the lens straps or lens holding means 6' are secured to the lenses at a high position known in the art as "above the useful field of side vision."

The feature embodying the invention similarly applies to each of these lens straps but, for ease of description, only the means and method of securing the resilient means to the "on-center" type strap is given.

Although the pin has been described as being butt soldered to the portion 6 prior to placing the resilient sections 14, 15 and 16 thereon and prior to the heating and compressing of the pin member to displace the body thereof to take up any looseness or play between the pin 9 and the attaching openings in the resilient sections and to simultaneously form the head 20 on the pin, it is to be understood that the resilient sections 14, 15 and 16 may be placed on the pin 9; the said pin and resilient means located in desired relation with the portion 6 of the strap and heat and pressure thereafter applied of an amount sufficient to secure the pin member to the strap and simultaneously displace said pin member so as to cause the body thereof to take up any looseness and play of the resilient means on said pin member and to form an integral head overlying said resilient means.

The lens strap may be thereafter fitted to the lens so that the openings 8 therein will be aligned with the attaching opening in the lens and with the resilient means engaging the adjacent edge of the lens. The said strap may be secured to the lens in this position.

In forming the lens strap or lens holding means, embodying the invention, sheet material having a precious metal coating on one side thereof, or of solid precious metal, is run through suitable blanking dies which cut the material to the shape shown in Fig. II. This blanked out shape provides a central portion 6 which, in the finished product, is adapted to overlie the edge of the lens, and also provides ear portions 7 which are adapted to overlie the opposed surfaces of the lens. The ears 7 are provided with openings 8 which are adapted to be aligned with a suitable opening in the lens to receive connecting means, such as screws, solder pins, or any other desirable connecting means known in the art, by which the lens strap may be pivotally secured to the lens. One of the surfaces, preferably the surface which is to be positioned inwardly of the lens strap, is skived or otherwise cleansed and prepared to receive the connecting pin 9, as shown in Fig. VII.

The pin 9, as shown in Figs. III and IV, is formed of bar stock 10 of gold filled, nickel, or silver material having an inner core 11 of a suitable solder, such as hard silver solder, therein. This core extends longitudinally of the bar stock. The bar stock in its initial form has a circular cross section as illustrated in Fig. IV.

The bar 10 having the silver solder core therein is then run through suitable rolling dies which shape it to the finished cross-sectional shape desired of the pin 9 which, in this instance, is of a rectangular shape such as shown in Figs. V and VI. This step in the process also reduces the bar stock to the outside diameter desired of the pin 9. The bar stock 10 is then cut substantially to the length desired for the pin 9.

The pin 9 is then placed and held in desired assembled relation with the blanked out part of the lens strap or lens holding means of Fig. II, as shown in Fig. VII, with one of its ends engaging the central portion 6. Heat of a suitable temperature is then applied to the assembled parts of Fig. VII to cause the inner solder core 11 to flow and secure the pin 9 to the inner surface of the portion 6. This step of the process is described as butt soldering.

The pin 9 may be cut to the proper length prior to said soldering or may be cut to the length desired after the said soldering. The assembled parts of Fig. VII are put through a suitable mitre device for squaring up or truing the parts to desired relation with each other.

The ears 7, as shown in Fig. VIII, are then bent to assume a substantially parallel relation with each other and to position the openings 8 in substantially aligned relation with each other. The portion 6 is then secured to the depending bridge supporting portion 12 or to the temple supporting endpiece 3 as the case may be.

The resilient means 13 which comprises a plurality of resilient sections 14, 15 and 16 of varying lengths, as shown in Fig. IX, and which have central openings therein of substantially the same contour shape as the cross-sectional shape of the pin 9, are placed in assembled relation with said pin 9, as shown in Figs. VIII to X, inclusive. The assembled resilient means and lens holding means are then placed in a suitable holding device and a suitable hot riveting tool 17 is moved into engagement with the pin 9. Heat is then applied to the pin 9, either electrically or otherwise, of such a temperature as to permit the body 18 of said pin to be compressed against the side walls 19 of the various resilient sections to take up any of the looseness which may exist in the fitting of the various resilient sections on the pin 9 and also to permit the pin to spread out and form a head 20 for positively securing the various resilient sections to the inner supporting face 21 of the portion 6. It is to be born in mind that the pin 9 has been soldered, preferably hard soldered, to the inner supporting surface 21 of the portion 6, as illustrated at 22. This operation being performed by butt soldering the pin 9 to the portion 6, as illustrated in Fig. VII, and as previously described above.

The step of securing the various resilient sections, 14, 15 and 16, to the pin 9 as described above is designated as a hot riveting process. This step includes the displacing of the body of the pin 18 to take up any looseness and play between the pin 9 and attaching openings in the resilient sections and to simultaneously form the head 20 on the pin. This step also compensates for any variations in the lengths of the pin members 9 and securely anchors the resilient sections in substantially intimate relation with each other and in intimate relation with the attaching seat 21 of the lens strap.

The attaching seat 21, as shown in Fig. X, is provided with a curved surface substantially equal to that of the curved shape of the resilient section 16 and is so formed as to obviate any tendency of the various resilient sections to straighten out and lose their desired curved shape during the securing thereof to the lens strap.

Although applicant has set forth some of the intermediate steps in the process of manufacture, the essence of the invention more particularly resides in the step of butt soldering the pin 9 to the portion 6 of the lens strap, positioning the various spring sections on said pin member and thereafter applying heat and pressure sufficient to bring about the hot riveting step of the process described above. The body 18 of the pin 9, during this step of the process is forced into intimate relation with the side walls 19 of the openings in the resilient sections and the head 20 is simultaneously turned over the various resilient sections to force them into intimate relation with each other and with the supporting seat 21 of the lens strap. This process provides simple, efficient and dependable means and method of securing the said resilient means to said lens strap wherein variations of the fit and sizes of the parts are quickly and easily compensated for during the process of anchoring the resilient sections on the pin member.

Although applicant has shown and described the lens strap or lens holding means as comprising two portions 7 for overlying the opposite faces of the lens, it is to be understood that the said lens strap may have only one of said portions 7, as is common practice in the art.

The construction of the lens strap 6' is generally similar to that of the lens strap 5, the only difference being that the various resilient sections, pin members, and so forth, are secured to the inner surface of an upwardly projecting lug 23 on the lens strap 6'. This is for the purpose of providing a more balanced resilient action on the opposite sides of the pivot connection 24 to the lens.

It is to be understood that although the pin 9 is described herein as being formed with a solder core, and that it is butt soldered to the portion 6 of the lens strap, that the said pin may be formed of solid stock and welded to the inner surface of the portion 6 if desired.

It is also to be understood that although the pin is described as being butt soldered to the inner surface of the portion 6, the said portion 6 may be formed with an opening. The pin may be formed to such a length as to have a portion extending inwardly of said opening and may thereafter be soldered or welded therein. In this instance, as in the instance stated above, the various spring sections may thereafter be placed on the pin 9 and the hot riveting process completed.

Having described my invention, I claim:

1. The method of forming lens holding means comprising a portion shaped to overlie a face of the lens and a portion shaped to overlie an edge of the lens, placing a pin member having a solder core internally of an opening in resilient means, placing the said pin member and resilient means in assembled relation with a portion shaped to overlie the edge of the lens and applying heat to said pin member sufficient to cause the solder to flow between said pin member and portion shaped to overlie the edge of the lens and simultaneously applying pressure on said pin member sufficient to cause the end thereof opposite the portion shaped to overlie the edge of the lens to flow outwardly over the resilient means and form an integral head, the said solder being adapted to congeal upon cooling and to cause said pin member to be secured to said portion shaped to overlie the edge of the lens.

2. The method of forming a lens holding means comprising providing a portion shaped to overlie a face of the lens and a portion shaped to overlie an edge of the lens, placing a pin member partially composed of solder inwardly of an opening, of substantially the same form as that portion of the pin adapted to lie therein, in resilient means having a thickness less than the length of said pin member, placing said resilient means and pin member in assembled substantially flush relation with each other and with the portion shaped to overlie an edge of the lens and applying heat to said pin member of a temperature sufficient to cause the solder to melt and flow between the said pin member and a portion shaped to overlie an edge of the lens and simultaneously applying pressure on said pin member sufficient to cause the length of the same to be decreased and to simultaneously cause the end thereof opposite the end towards the portion shaped to overlie an edge of the lens to flow outwardly over the resilient means to form an integral head on said pin member of greater area than said opening and protruding outwardly of the surface which it overlies, the said solder, upon cooling being adapted to secure the portion shaped to overlie the edge of the lens to said pin member while maintaining the securing portion within the limits of said opening, and said resilient means in said flush relation.

JOHN E. MERRILL.